United States Patent Office 3,237,220
Patented Mar. 1, 1966

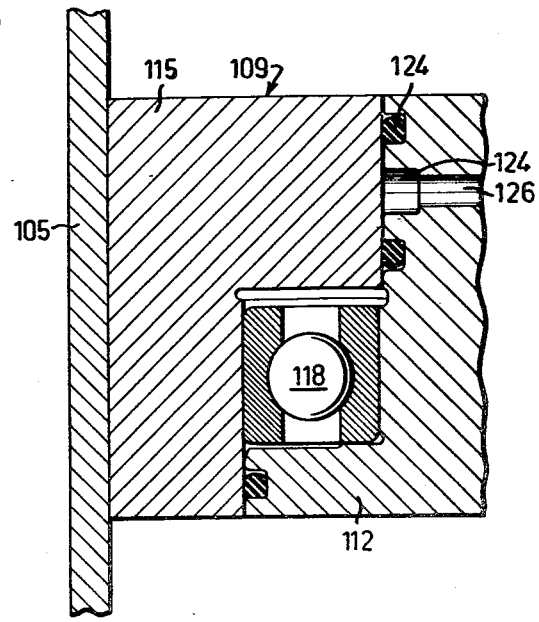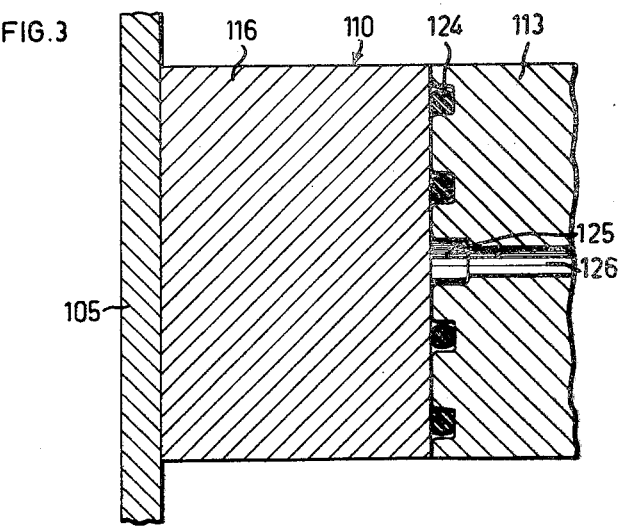

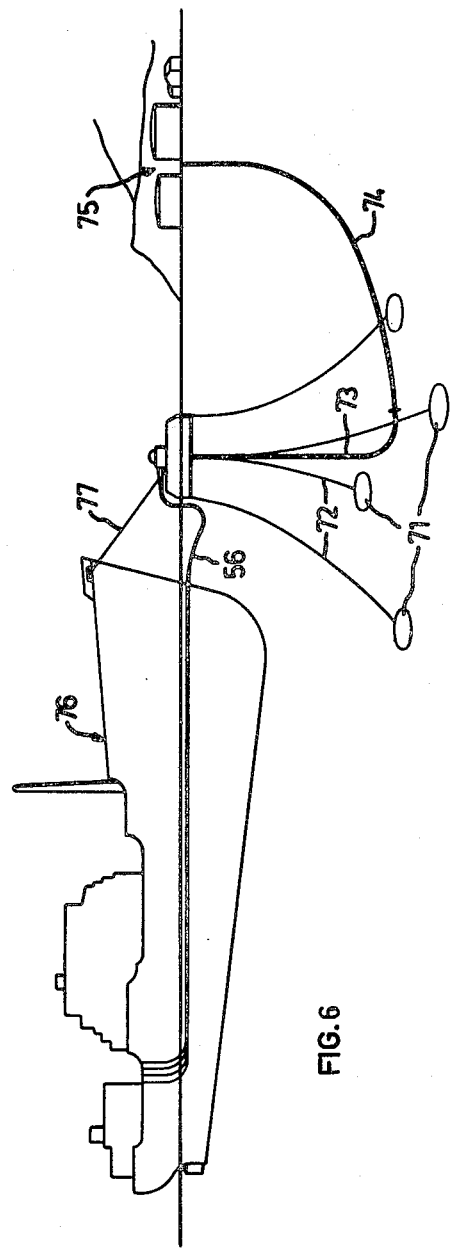

3,237,220
PIPE SWIVELS
Bengt-Åke Brandt, Stockholm, Sweden, assignor, by mesne assignments, to Imodco International Limited, Nassau, Bahamas, a company of the Bahamas
Filed Jan. 23, 1963, Ser. No. 253,356
Claims priority, application Sweden, Jan. 31, 1962, 1,050/62
6 Claims. (Cl. 9—8)

This invention relates to a pipe swivel having several separate throughflows for pivoted connection of one set of conduits with another set of conduits. More particularly, the swivel is intended for use with a buoy to which tankers can be moored to load, unload or bunker through a set of hoses connected between the tanker and the swivel which on the other hand is in communication with a stationary depot through another set of hoses and pipelines, while the tanker can swing about the buoy under the action of winds and currents.

A buoy of this type is shown and described in U.S. patent application Serial No. 109,988 filed May 15, 1961, now U.S. Patent No. 3,082,440, also assigned to the same corporation, and the present invention relates to an improved construction of the pipe swivel which is used on said buoy.

The swivel has an inner portion adapted to be fixedly secured to the buoy and presenting a plurality of channels adapted to be brought in communication separately with a liquid depot, and an outer portion rotatable relative to the inner portion about a vertical axis and having a corresponding number of channels which communicate each with one of the channels of the inner portion and which are adapted to be brought in communication separately with a ship moored to the buoy.

The primary object of the invention is to provide improved mounting and sealing means between the inner and outer portions of the swivel.

An essential object in this connection is to provide an inner swivel portion which, without being radially deformed, is able to withstand inner hydraulic forces caused by pressure differences between the different channels and tending to change the cross sectional shape of the inner portion.

Another object is to provide the two portions of the swivel with rigid sealing surfaces which conform well to each other also at large radial stresses.

A further object is to provide said sealing surfaces with efficient sealing means using air under pressure to prevent leakage from one channel into another within the swivel.

Still another object is to exploit the inner pressure in the swivel to take up part of the weight of the outer portion of the swivel.

A still further object is also to provide a swivel having anti-friction bearings between the inner and the outer portions.

Figure 1:
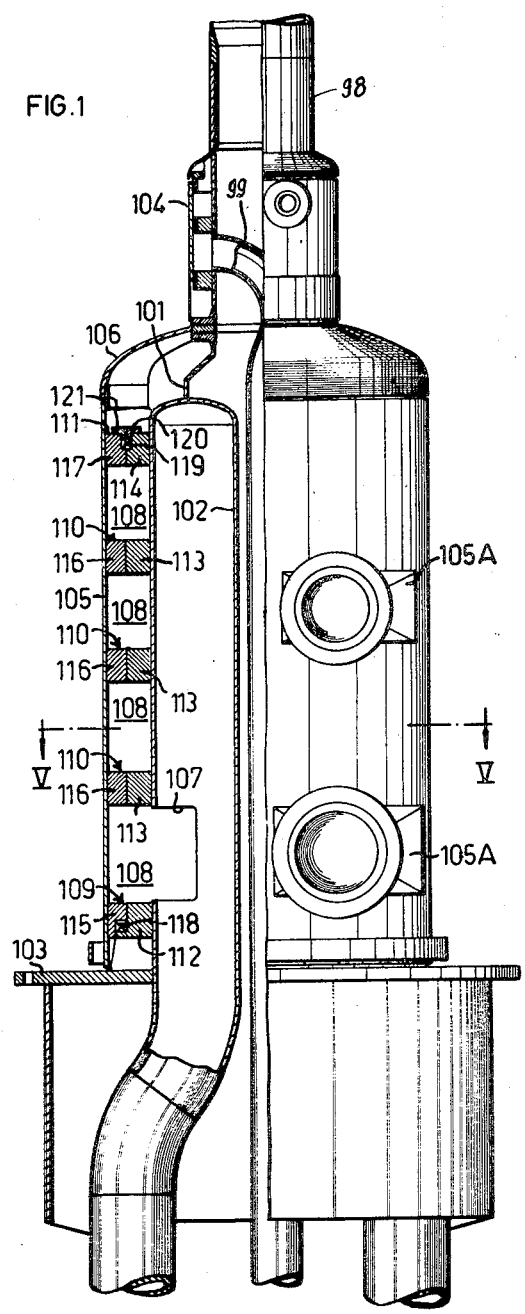
Figure 4:
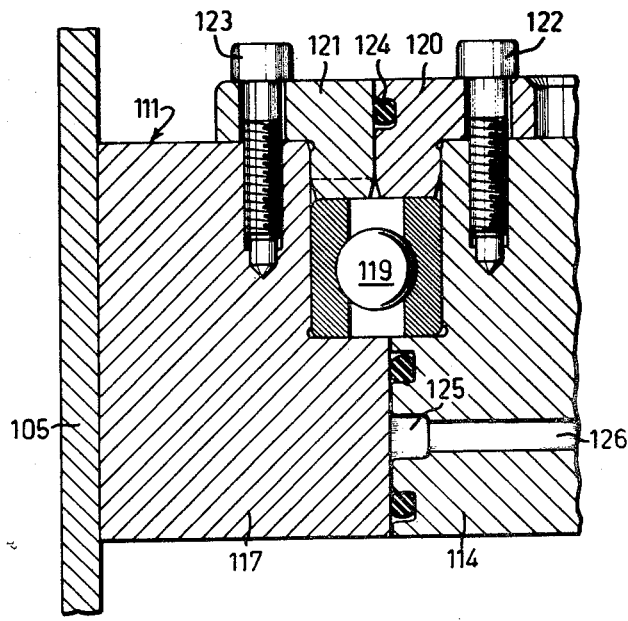
Figure 5:
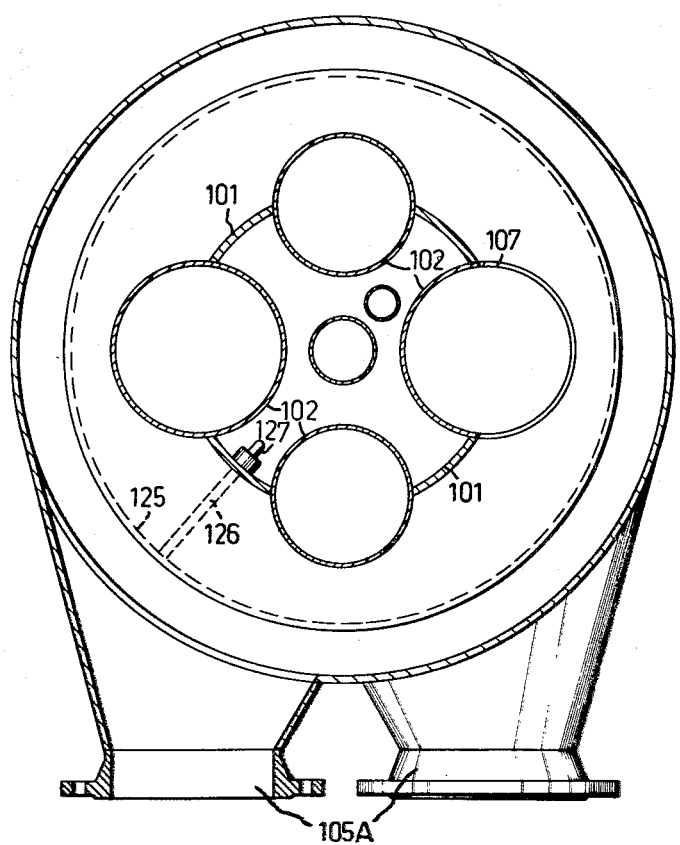

Further objects of the invention and the advantages thereof will appear from the following detailed description of an embodiment thereof shown in the accompanying drawings in which:

FIG. 1 is an elevational and partly sectional view of a swivel according to the invention, FIGS. 2, 3 and 4 are views on a larger scale and more in detail of a lower portion, an intermediary portion and an upper portion of the section in FIG. 1, FIG. 5 is a horizontal sectional view on line V—V in FIG. 1, on a larger scale; and FIG. 6 is a view showing a ship moored to a buoy according to the invention.

The swivel shown has an inner portion formed by a vertical cylindrical sheet metal shell 101 which is open at both ends and has several—in the present instance four—vertical slots and a corresponding number of cylindrical pipes 102 of substantially equal vertical height which are welded each into one slot and which are closed at the upper ends and extended downward for connection by hoses 73 to pipelines 74 on the bottom of the sea. The entire inner portion is supported by an annular metal sheet 103 welded about the inner portion, reinforced with a skirt 103A and adapted to be secured to the upper face of a buoy 69 (shown in FIG. 6) over an opening therein. This design will provide an open space in the inner portion of the swivel, which can be used for different purposes, such as ventilation of the buoy and running of various smaller pipelines, such as pipe 99, for compressed air, fresh water, etc., and electric cables to an upper auxiliary connector device 104 mounted on the inner portion of the swivel, and a mast 98 standing on the connector device 104. Details 104, 99 and 98 are not comprised in the present invention nor are the details of the buoy which may be of any suitable construction whatever, but preferably is built and equipped as shown and described in the said U.S. patent application Serial No. 109,988 to which reference is made for further details. The buoy 69, as seen in FIG. 6, is moored by mooring lines 72 attached to weights or the like 71 offshore of a depot 75. A ship 76 is moored to the buoy by a line 77, and hoses 56 extend from the buoy to the ship.

The outer portion of the swivel is composed of a cylindrical sheet metal shell 105 which is mounted on the inner swivel portion and covered at the top by a bonnet 106 attached to said inner swivel portion.

The flow connections between the inner and the outer swivel portions are formed by openings 107 in the portions of the pipes 102 situated outside the sheet metal shell 101. The openings 107 are situated on different levels and communicate with different annular chambers 108 lying between the inner and outer portons of the swivel and vertically defined by a number of horizontal partitions or decks 109, 110, 111 and communicating in turn each with one connection 105A for the hoses 56 on the outer sheet metal shell 105. Each deck 109, 110, 111 comprises an inner portion 112, 113, 114 which is conformed to, and welded on the outer side of, the inner sheet metal shell 101 and the pipes 102 welded thereinto, and an outer portion 115, 116, 117 in the shape of a ring which is welded to the inner side of the outer sheet metal shell 105.

Built into the lowermost deck 109 and the uppermost deck 111 are ball bearings 118 and 119, respectively, by means of which the outer portion of the swivel is mounted on the inner portion thereof, as shown in FIGS. 2 and 4. The lower bearing 118 only acts as a radial bearing while the upper bearing 119 which is built into the deck 111 with the aid of a pair of separate rings 120, 121 and screws 122, 123 also acts as a thrust bearing to support the outer portion of the swivel.

In each deck 109, 110, 111, the inner and outer portions have cylindrical sealing surfaces on the outer and inner edges, respectively, and they are sealed from each other by means of O-rings 124 inserted in grooves in the sealing surface of the inner portion. In FIG. 3 which shows one of the intermediary decks 110, sealing rings 124 are shown above and below an annular groove 125 provided in one sealing surface, in the present instance the sealing surface of the inner portion 113, from which groove a passage 126 is drilled through the inner portion 113 of the deck and the sheet metal shell 101. The passage 126 thus opens in the inner side of the inner swivel portion and at this point it has connected to it a compressed air conduit 127 (FIG. 5) for supplying air from for example a compressor in the buoy to the annular groove 125 under a higher pressure than that momentarily prevailing in chambers 108. As will appear from FIGS. 2–4 the arrangement is fundamentally the same in all decks 109, 110, 111. This will fully guarantee that nothing of the liquid pumped through the swivel leaks from one chamber 108 to another or into the sea.

A further improvement in connecton with the sealing device resides in that the cylindrical sealing surfaces have a smaller diameter in the uppermost deck 111 than in the lowermost deck 109, i.e. the underside of the ring 117 has a smaller inner diameter and thus a larger horizontal area than the upper side of the ring 115. At an equally large pressure above atmospheric in the uppermost and the lowermost chambers 108 there will thus be obtained an upwardly directed net force on the outer swivel portion, whereby the weight of the latter will be balanced and consequently the bearing 119 will be relieved of load.

What I claim and desire to secure by Letters Patent is:

1. In combination, a pipe swivel having a plurality of throughflows, said swivel comprising an inner swivel portion formed by a vertical cylindrical sheet metal shell open at both ends and having a plurality of vertical slots therein, and a corresponding number of cylindrical pipes with a pipe being welded into each slot and having their upper ends at substantially the same level and which pipes are closed at their upper ends and which extend downward and are adapted to be connected with conduits on the sea bottom, said pipes each having a portion of the periphery situated outside the sheet metal shell and having an opening in said portion, the openings in the respective pipes being on different levels, an outer swivel portion formed by a second cylindrical sheet metal shell which is spaced from and encloses the inner portion and having a corresponding number of hose connectons at levels corresponding to the levels of the openings in the pipes, and decks extending between the outer and inner shells dividing the space between said swivel portons into a corresponding number of annular chambers each communicating with one of said pipes through the opening thereof and with a hose connection on the outer sheet metal shell which is at the level of the annular chamber, and a floating body on the top portion of which said pipe swivel is mounted, said floating body and said pipe swivel having relative weights such that the floating body is adapted to float with the pipe swivel maintained in a substantially upright position, whereby when the conduits on the sea bottom are connected to a depot on the shore, tankers can be moored to the floating body for loading and unloading and can have hoses connected to the pipe swivel, and the tankers can swing about the floating body under the influence of wind and tide while the swivel rotates the hose connection to follow the swinging of the tankers.

2. The combination as claimed in claim 1 in which each horizontal deck consists of an inner part fixedly united with the inner swivel portion, and an outer part fixedly united with the outer swivel portion, said two parts having opposed cylindrical sealing surfaces in sealing engagement.

3. The combination as claimed in claim 2 in which the sealing surfaces are provided with at least two sealing rings and one sealing surface has an annular groove therein and a conduit opening into said groove, said conduit being adapted to communicate with a compressed air conduit, said sealing rings being on opposite sides of said groove.

4. The combination as claimed in claim 2 in which the sealing surfaces in the uppermost deck have a smaller diameter than do the sealing surfaces in the lowermost deck.

5. The combination as claimed in claim 1 in which there are ball bearings mounting the outer swivel portion on the inner swivel portion built into the lowermost and uppermost decks.

6. A buoy having means for non-rotatable anchoring thereof at sea, means for so mooring a ship to the buoy that it is able to swing about it, and a pipe swivel on the upper part of said buoy for establishing a multiple conduit connection between a stationary depot and a ship moored to the buoy, said pipe swivel comprising an inner swivel portion formed by a vertical cylindrical sheet metal shell open at both ends and having a plurality of vertical slots, and a corresponding number of pipes with a cylindrical pipe being welded into each slot and having their upper ends at substantially the same level and which pipes are closed at their upper ends and extended downward and are adapted to be connected with conduits on the sea bottom and which extend to said depot, said pipes each having a portion of the periphery situated outside the sheet metal shell and having an opening in said portion, the openings in the respective pipes being on different levels, and an outer swivel portion formed by a second cylindrical sheet metal shell which is spaced from and encloses the inner portion and having a corresponding number of hose connections at levels corresponding to the levels of the openings in the pipes, and decks extending between the outer and inner shells dividing the space between said swivel portions into a corresponding number of annular chambers each communicating with one of said pipes through the opening thereof and with a hose connection on the outer sheet metal shell which is at the level of the annular chamber.

References Cited by the Examiner

UNITED STATES PATENTS

| | | | |
|---|---|---|---|
| 2,343,491 | 3/1944 | Bard | 285—136 |
| 2,458,343 | 1/1949 | Carleton | 285—136 |
| 2,477,334 | 7/1949 | Hibner | 285—96 |
| 2,768,843 | 10/1956 | Zeilman | 285—136 |
| 2,772,898 | 12/1956 | Seeler | 285—190 |
| 2,781,134 | 2/1957 | Weir | 285—136 |
| 2,840,262 | 6/1958 | Learmonth | 285—96 |
| 2,873,810 | 2/1959 | Orton | 285—137 |
| 3,082,440 | 3/1963 | Rhedin | 9—8 |

FOREIGN PATENTS 759,098  10/1956  Great Britain.

MILTON BUCHLER, *Primary Examiner.*

CARL W. TOMLIN, *Examiner.*

S. R. MILLER, R. G. BESHA, *Assistant Examiners.*